United States Patent
Mogi et al.

(10) Patent No.: US 7,374,836 B2
(45) Date of Patent: May 20, 2008

(54) FUEL CELL APPARATUS

(75) Inventors: Satoshi Mogi, Yamato (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 11/181,767

(22) Filed: Jul. 15, 2005

(65) Prior Publication Data

US 2006/0019145 A1    Jan. 26, 2006

(30) Foreign Application Priority Data

Jul. 23, 2004   (JP)   ............... 2004-216365

(51) Int. Cl.
*H01M 8/04* (2006.01)
*H01M 8/02* (2006.01)

(52) U.S. Cl. .................. 429/34; 429/13; 429/38; 429/39

(58) Field of Classification Search .................. 429/13, 429/34
See application file for complete search history.

(56) References Cited

U.S. PATENT DOCUMENTS 6,194,095 B1 *  2/2001 Hockaday ............... 429/34
2003/0003343 A1 *  1/2003 Cisar et al. ............. 429/36
2003/0082427 A1 *  5/2003 Prasad et al. ........... 429/34
2004/0028966 A1 *  2/2004 Hibbs et al. ............ 429/21
2004/0202917 A1 * 10/2004 Chapman et al. ........ 429/37
2004/0241511 A1   12/2004 Kamihara et al. ....... 429/22
2005/0053823 A1 *  3/2005 Cho et al. .............. 429/34

FOREIGN PATENT DOCUMENTS

JP      2003-331888      11/2003

* cited by examiner

*Primary Examiner*—Susy Tsang-Foster
*Assistant Examiner*—Alix Echelmeyer
(74) *Attorney, Agent, or Firm*—Fitzpatrick, Cella, Harper & Scinto

(57) ABSTRACT

A fuel cell apparatus includes an electric power generation unit with a plurality of membrane electrode assemblies each having an oxidizer electrode to which an oxidizer is fed and a fuel electrode to which a fuel is fed, the oxidizer electrode and the fuel electrode being arranged through an electrolyte membrane. The plurality of membrane electrode assemblies are stacked through a fuel feed path and an oxidizer feed path. In addition, a fuel storage unit holds the fuel to be fed to the fuel electrode of the electric power generation unit, and a fuel flow path connects the fuel storage unit and the electric power generation unit. The fuel feed path and the oxidizer feed path arranged between the plurality of membrane electrode assemblies are formed by an elastic material.

1 Claim, 6 Drawing Sheets

FUEL CELL APPARATUS

BACKGROUND OF THE INVENTION

1. Field of the Invention

The present invention relates to a fuel cell apparatus for generating electric power through a reaction between a fuel and an oxidizer, and more specifically to a fuel cell apparatus having a fuel storage unit and fuel flow path.

2. Related Background Art

A fuel cell includes, as an electric power generation unit, a membrane electrode assembly in which an electrolyte membrane is interposed between a fuel electrode containing a catalyst and an oxidizer electrode containing a catalyst. In the membrane electrode assembly, a fuel such as a hydrogen gas is fed to the fuel electrode side, and an oxidizer such as an oxygen gas is fed to the oxidizer electrode side to perform an electrochemical reaction of the fuel and the oxidizer through the electrolyte membrane.

Recently, fuel cells are expected to be used for small electrical instruments such as digital cameras and laptop computers. This is because a fuel cell may feed an amount of energy per volume of several to about ten times that of a conventional battery, and thus may allow continuous use of the small electrical instruments for a long time by supplying a fuel.

In such portable fuel cells, a fuel required for electric power generation such as hydrogen is held in a fuel tank or the like, which is separate from the electric power generation unit. The fuel in the fuel tank is fed to the electric power generation unit through a fuel flow path. In a case where a fuel is consumed in electric power generation, the fuel is filled or the fuel tank is exchanged. For exchange of the fuel tank, the fuel tank must be removed from a fuel cell body once.

For example, in a fuel cell apparatus using a gas as a fuel, atmospheric air may mix into the fuel flow path during exchange of the fuel tank. Mixing of the atmospheric air into the fuel flow path causes significant reduction in power output of the fuel cell, and thus the gas in the fuel flow path must be replaced with a fuel gas after the exchange of the fuel tank.

Further, in a fuel cell using an aqueous solution of methanol or the like as a fuel, a methanol concentration in a vicinity of the fuel electrode may decrease due to electric power generation. In this case, the methanol solution in the flow path must be replaced with a fresh methanol solution.

For example, Japanese Patent Application Laid-Open No. 2003-331888 discloses a method of replacing a gas in a fuel flow path, including: feeding a fuel gas; and discharging the fuel gas from a hydrogen replacement valve.

However, in the above-described method, a volume of fuel consumed in gas replacement may reach several times the volume of the fuel flow path. Such fuel consumption due to gas replacement causes reduction in amount of energy obtained through power generation in a fuel cell.

SUMMARY OF THE INVENTION

An object of the present invention is therefore to provide a small fuel cell apparatus allowing gas replacement in a fuel flow path through a simple method with little fuel consumption, and thus allowing continuous operation for a long time.

That is, according to a first aspect of the present invention, a fuel cell apparatus includes: an electric power generation unit including a membrane electrode assembly having an oxidizer electrode to which an oxidizer is fed and a fuel electrode to which a fuel is fed, the oxidizer electrode and the fuel electrode being arranged through an electrolyte membrane; a fuel storage unit for holding the fuel to be fed to the fuel electrode of the electric power generation unit; and a fuel flow path for connecting the fuel storage unit and the electric power generation unit, wherein the fuel flow path has a variable volume.

According to a second aspect of the present invention, a fuel cell apparatus includes: an electric power generation unit including a plurality of membrane electrode assemblies each having an oxidizer electrode to which an oxidizer is fed and a fuel electrode to which a fuel is fed, the oxidizer electrode and the fuel electrode being arranged through an electrolyte membrane, wherein the plurality of membrane electrode assemblies are stacked through a fuel feed path and an oxidizer feed path; a fuel storage unit for holding the fuel to be fed to the fuel electrode of the electric power generation unit; and a fuel flow path for connecting the fuel storage unit and the electric power generation unit, wherein at least the fuel feed path of the fuel feed path and the oxidizer feed path arranged between the plurality of membrane electrode assemblies has a variable volume.

In the above-described fuel cell apparatus, a valve is preferably provided in the fuel flow path.

In the above-described fuel cell apparatus, the plurality of electrolyte membrane assemblies are preferably stacked through a separator having a fuel feed path and an oxidizer feed path.

DESCRIPTION OF THE PREFERRED EMBODIMENTS

In a fuel cell apparatus according to a preferable embodiment of the present invention, it is possible to simply perform gas replacement in a fuel flow path with little fuel consumption. In this way, a fuel in a fuel tank can be efficiently used for electric power generation, to thereby provide a small fuel cell apparatus allowing continuous operation for a long time. Further, pressure fluctuation in the fuel flow path is suppressed during electric power generation, to thereby provide a fuel cell apparatus capable of outputting stable electric power.

Hereinafter, a preferable embodiment of the present invention will be described in detail.

Figure 1:
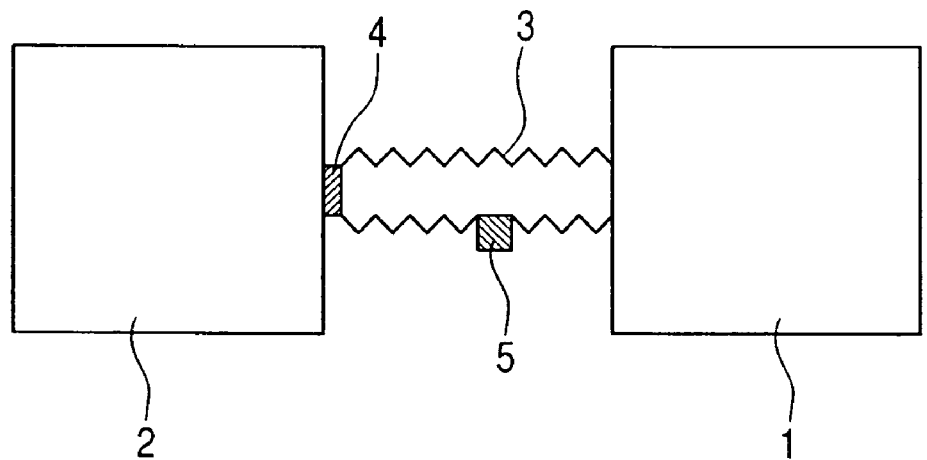
FIG. 1 is a schematic diagram showing a construction of a fuel cell apparatus according to a preferable embodiment of the present invention.

A preferable embodiment of the present invention is shown in FIG. 1.

FIG. 1 is a schematic diagram showing a construction of a fuel cell apparatus according to a preferable embodiment of the present invention. Reference numeral 1 denotes an electric power generation unit including a membrane electrode assembly having an oxidizer electrode to which an oxidizer is fed and a fuel electrode to which a fuel is fed arranged through an electrolyte membrane. Reference numeral 2 denotes a fuel tank as a fuel storage unit for holding the fuel to be fed to the fuel electrode of the electric power generation unit. Reference numeral 3 denotes a fuel flow path for feeding the fuel stored in the fuel tank to the fuel electrode of the electric power generation unit. A connecting valve 4 is provided at a connecting part of the fuel flow path and the fuel tank, and a purge valve 5 is provided in the fuel flow path.

The membrane electrode assembly of the electric power generation unit 1 has a structure in which an electrode containing a catalyst is provided on both sides of the electrolyte membrane. The electrolyte membrane is formed of a proton conductive polymer material, for example. To be specific, a perfluorocarbon-based, non-perfluorocarbon-based, or hybrid-based ion exchange membrane is used for the electrolyte membrane, but the present invention is not limited to those materials. As an electrode containing a catalyst, there is carbon powder containing platinum fine particles, for example. A fuel is fed to one electrode of the membrane electrode assembly, and an oxidizer is fed to the other electrode, to thereby generate electromotive force between the electrodes for electric power generation.

Examples of a method of storing a fuel in the fuel tank 2 include: a method involving compression of a fuel and storage of the fuel as a high-pressure gas; and a method involving storage in a hydrogen storage alloy, a carbon-based material, or the like.

The fuel flow path 3 for feeding the fuel to the electric power generation unit is provided with the connecting valve 4 allowing detachment and attachment of the fuel tank and the electric power generation unit; the purge valve 5 for replacing a gas in the fuel flow path; and the like.

The fuel flow path 3 of the present invention has such a feature of a structure that the volume of the fuel flow path is variable. Examples of the structure with a variable volume include: a structure which has unevenness on a peripheral surface of a fuel flow path and which is formed to be retractable as shown in FIG. 1; and a structure in which a fuel flow path is formed of a retractable material having elasticity or flexibility.

The connecting valve has a function of allowing detachment and attachment of the fuel tank, and a function of preventing fuel leak from the fuel tank when the fuel tank is not attached to the electric power generation unit. Meanwhile, the purge valve has a function of replacing a gas in the fuel flow path, and a function of discharging the fuel gas to atmosphere when a gas pressure in the fuel flow path increases abnormally. The connecting valve and the purge valve may open or close by pressure change, or may operate by external signals.

Next, description will be given of an operation of gas replacement when the fuel tank is attached to the electric power generation unit. Before the fuel tank is attached thereto, an impurity gas from atmosphere except for a fuel gas is mixed into the fuel flow path, so that a desired power output cannot be obtained during operation of the fuel cell. In order to discharge the fuel mixed with the impurity gas from the fuel flow path, a volume of the fuel flow path is reduced to discharge the gas in the fuel flow path through the purge valve. After the gas in the fuel flow path is discharged, the purge valve is closed and the fuel tank is connected to the fuel flow path. The fuel gas is injected into the fuel flow path from the fuel tank, and the volume of the fuel flow path increases to a desired volume. Gas replacement in the fuel flow path is completed through the above-described operation.

According to the gas replacement method of the present invention, it is possible to suppress fuel consumption due to gas replacement because the impurity gas is discharged by reducing the volume of the fuel flow path and not by using the fuel gas. Thus, the present invention can provide a fuel cell apparatus allowing continuous operation for a longer time. Further, the fuel cell apparatus of the present invention requires no device for gas replacement such as a pump, to thereby provide a small fuel cell apparatus.

The fuel cell apparatus of the present invention allows gas replacement with an appropriate construction for reduction in size of a fuel cell apparatus. Further, the fuel cell apparatus of the present invention allows suppression of fuel consumption due to gas replacement and operation for a long time, to thereby provide stable power output of the fuel cell apparatus. Therefore, the fuel cell apparatus of the present invention can suitably be used for small portable instruments and the like.

FIRST EXAMPLE

Figure 2:
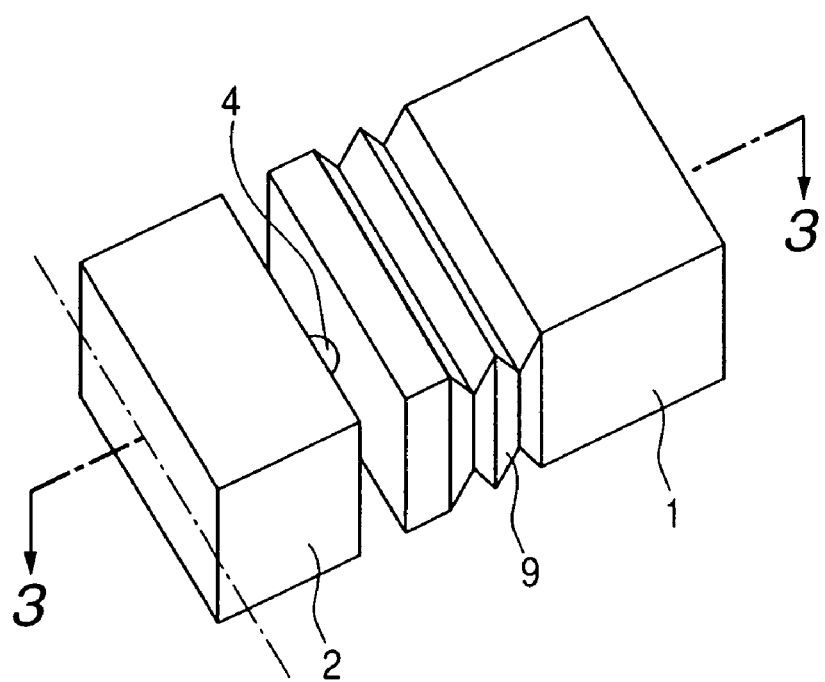
FIG. 2 is a schematic diagram showing a fuel cell apparatus according to a first example of the present invention.
Figure 3:
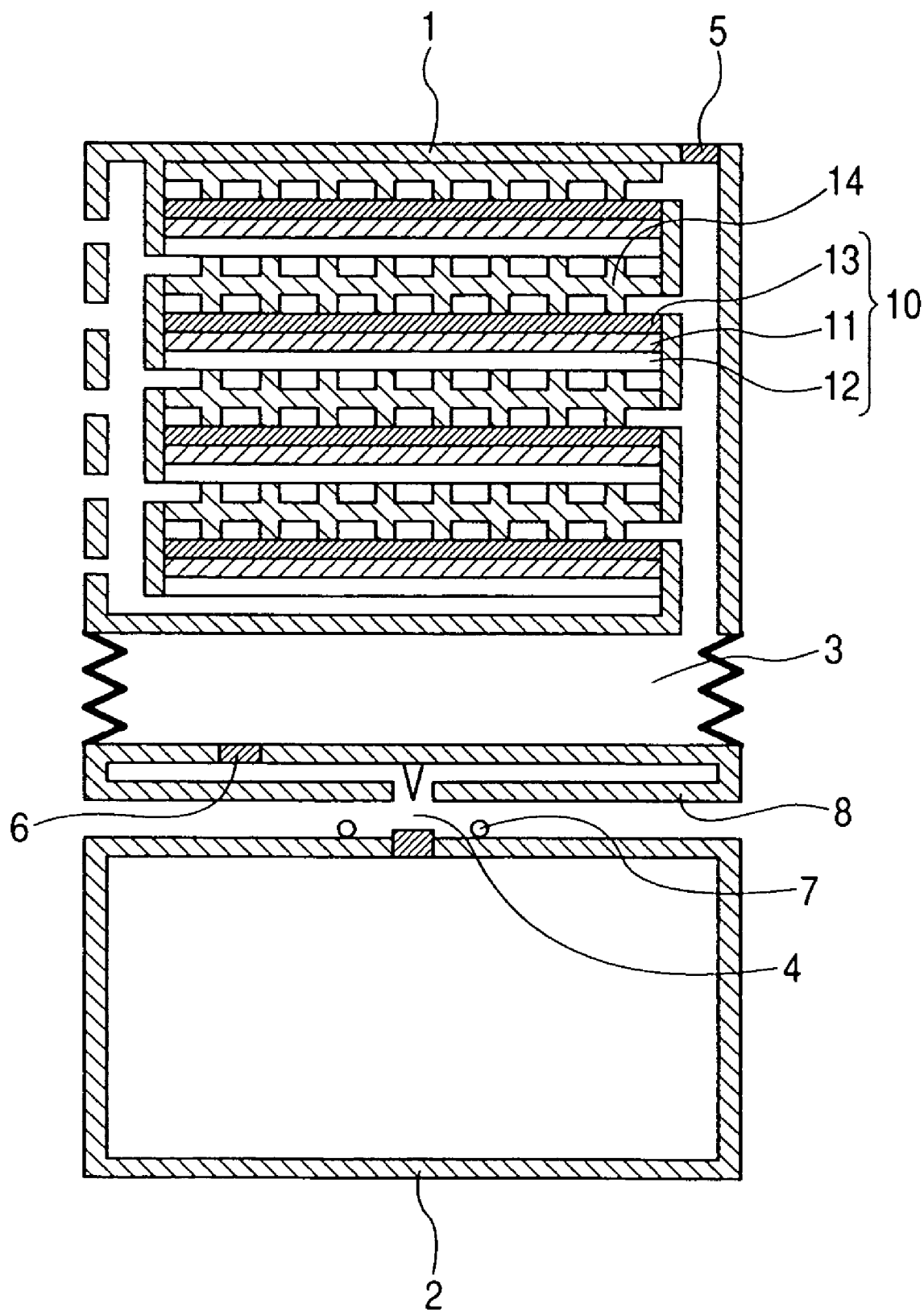
FIG. 3 is a sectional view showing the fuel cell apparatus of FIG. 2.
Figure 4:
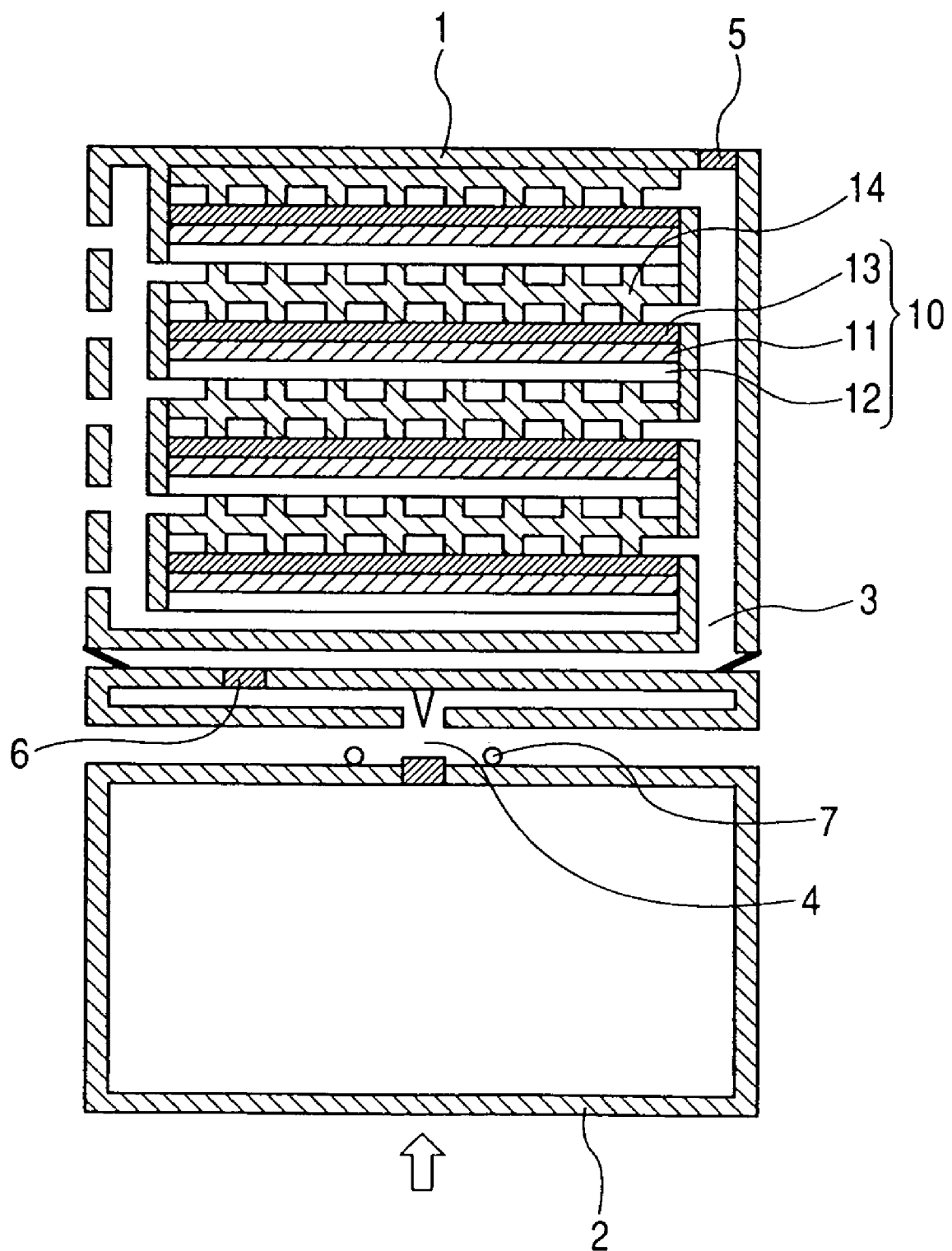
FIG. 4 is another sectional view showing the fuel cell apparatus of FIG. 2.

FIG. 2 is a schematic diagram showing a fuel cell apparatus according to a first example of the present invention. FIGS. 3 and 4 are sectional views showing the fuel cell apparatus of FIG. 2. FIGS. 3 and 4 are sectional views taken along the line 3-3 of FIG. 2.

In the fuel cell apparatus of the first example, hydrogen is used as a fuel, and atmospheric air is used as an oxidizer for electric power generation. Hydrogen as a fuel is compressed and stored in the fuel tank 2. An initial pressure of hydrogen is set to about 1 MPa at room temperature. A pressure regulating valve 6 is provided in the fuel flow path closer to the electric power generation unit than the connecting valve 4 for maintaining constant power output of the fuel cell. The pressure regulating valve is designed to open when a pressure in the fuel flow path is lower than 0.1 MPa and to close when the pressure therein is higher than 0.1 MPa. In this way, the pressure in the fuel flow path is maintained at about 0.1 MPa.

The purge valve 5 provided in the fuel flow path is designed to open when the pressure in the fuel flow path exceeds 0.15 MPa and to close when the pressure therein is 0.15 MPa or lower. In this way, the membrane electrode assembly of the electric power generation unit is prevented from breaking when the pressure in the fuel flow path increases abnormally.

Next, description will be given of an operation for attaching the fuel tank to the fuel cell apparatus having the above-described construction.

The fuel tank is attached by pressing the connecting valve of the fuel tank into a pairing connecting valve provided in the fuel flow path. At this time, a sealing member 7 provided between the connecting valves is compressed, and a covering member 8 is moved from an initial position (position shown in FIG. 3) in a direction for reducing the volume of the fuel flow path. In this way, a pressure of a fuel containing an impurity gas in the fuel flow path increases and exceeds 0.15 MPa, to thereby open the purge valve. A movable part 9 of the fuel flow path is compressed to an abutting position (position shown in FIG. 4), and change in volume of the fuel flow path stops. The pressure in the fuel flow path decreases, to thereby close the purge valve. The fuel tank is pressed further, and the sealing member 7 deforms, to thereby lock the connecting valve. Next, the fuel tank is pulled out, and the covering member 8 is returned to the initial position. The volume of the fuel flow path expands with movement of the covering member 8, and the pressure in the flow fuel path decreases. The pressure regulating valve operates at a pressure of 0.1 MPa or lower, and the fuel is fed to the fuel flow path from the fuel tank. Gas replacement in the fuel flow path is completed at which the fuel tank returns to the initial position.

As described above, the fuel flow path having a variable volume allows simple gas replacement when the fuel tank is attached to the electric power generation unit, and fuel consumption due to gas replacement can be suppressed, to thereby provide a fuel cell apparatus allowing operation for a long period of time.

SECOND EXAMPLE

Figure 5:
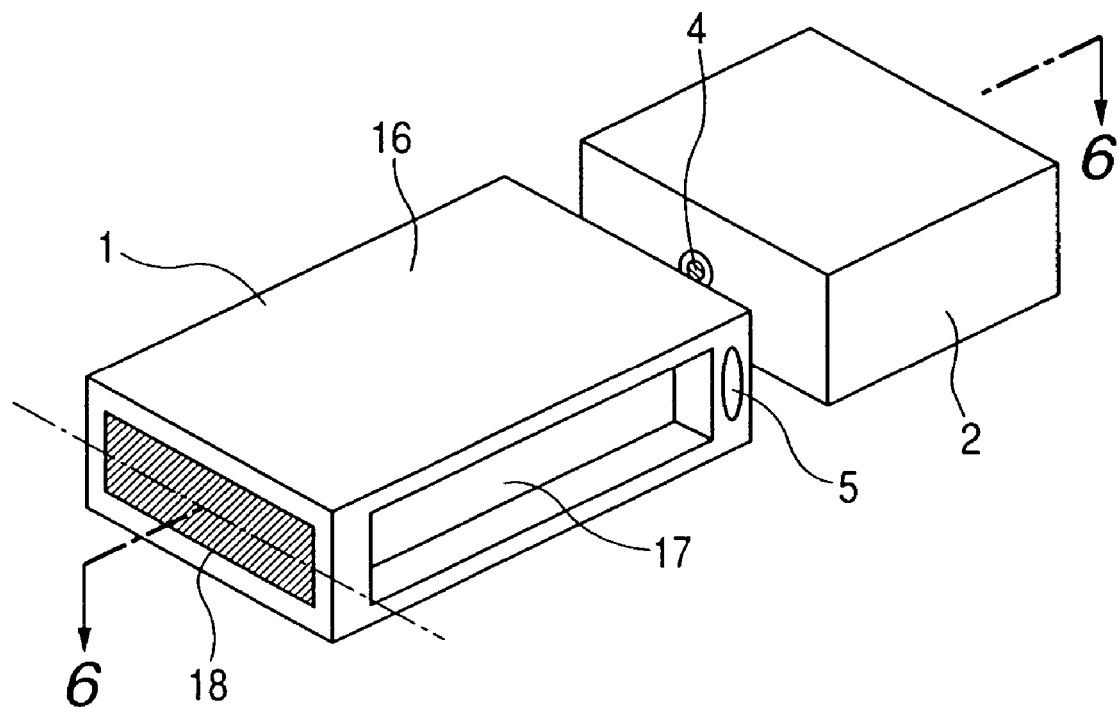
FIG. 5 is a schematic diagram showing a fuel cell apparatus according to a second example of the present invention.
Figure 6:
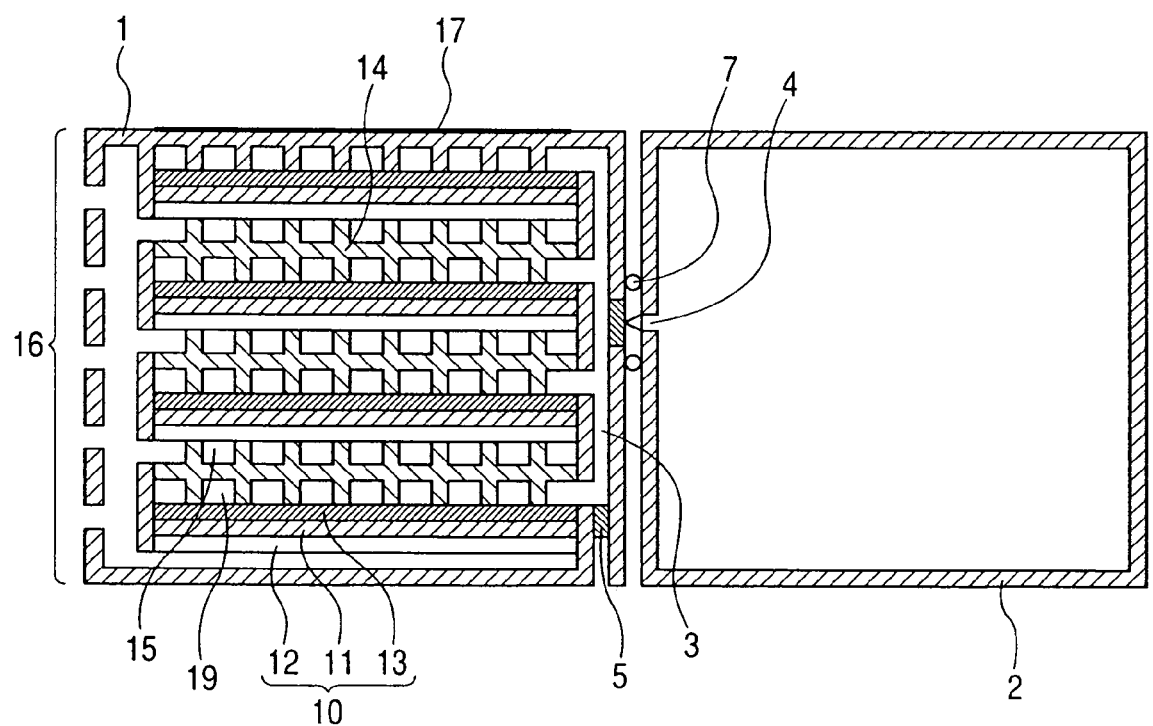
FIG. 6 is a sectional view showing the fuel cell apparatus of FIG. 5.
Figure 7:
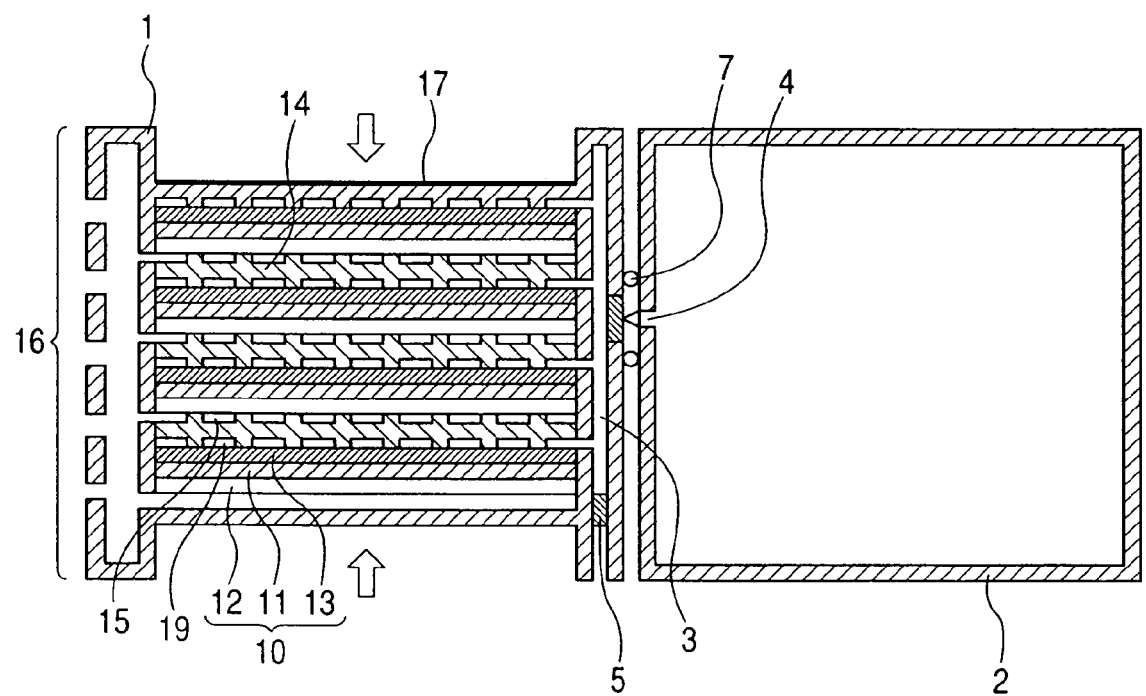
FIG. 7 is another sectional view showing the fuel cell apparatus of FIG. 5.

FIG. 5 is a schematic diagram showing a fuel cell apparatus according to a second example of the present invention. FIGS. 6 and 7 are sectional views showing the fuel cell apparatus of FIG. 5. FIGS. 6 and 7 are sectional views taken along the line 6-6 of FIG. 5.

In the fuel cell apparatus of the second example, a fuel cell stack 16 having a plurality of stacked membrane electrode assemblies 10 is used as the electric power generation unit 1. The fuel cell stack has a structure in which the membrane electrode assemblies and separators 14 are stacked as shown in FIGS. 6 and 7. Each of the separators has an oxidizer feed path 15 on a surface thereof in contact with the oxidizer electrode 12 of the membrane electrode assembly, and a fuel feed path 19 on a surface thereof in contact with the fuel electrode 13 of the membrane electrode assembly. The oxidizer feed path 15 and the fuel feed path 19 provided in the separators are each formed of an elastic material to allow change in volume thereof by application of force in a stack direction on an end plate 17 of the fuel cell stack. The fuel flow path 3 and the fuel feed path 19 are connected to each other.

Similarly in the second example, hydrogen is used as a fuel, and air is used as an oxidizer. Hydrogen as a fuel is stored in a hydrogen storage alloy $LaNi_5$ provided in the fuel tank 2 and used. A hydrogen release pressure is about 0.2 to 0.3 MPa at room temperature. The connecting valve 4 is provided between the fuel flow path and the fuel tank, and the purge valve 5 is provided in the fuel flow path. Air as an oxidizer is fed from an air introduction port 18.

Next, description will be given of an operation for attaching the fuel tank to the fuel cell apparatus having the above-described construction.

The fuel tank is attached by pressing and fixing the connecting valve of the fuel tank into a pairing connecting valve provided in the fuel flow path (position shown in FIG. 6). Next, force is applied in a stack direction of the fuel cell stack from the end plates (position shown in FIG. 7). The volumes of the oxidizer feed path and the fuel feed path provided in the separator decrease due to the force in a stack direction, to thereby increase the pressures in the fuel feed path and the fuel flow path. In this way, the purge valve opens, and the gas in the fuel feed path and the fuel flow path is discharged. The force in a stack direction is eliminated and the pressures in the fuel feed path and the fuel flow path decrease. Then, the fuel gas is introduced into the fuel flow path through the connecting valve.

Gas replacement in the fuel feed path and the fuel flow path is completed through the above-described operation. In this way, the fuel feed path and the fuel flow path each having a variable volume allow simple gas replacement when the fuel tank is attached to the electric power generation unit, and fuel consumption due to gas replacement can be suppressed, to thereby provide a fuel cell apparatus allowing operation for a long time.

This application claims priority from Japanese Patent Application No. 2004-216365 filed on Jul. 23, 2004, which is hereby incorporated by reference herein.

What is claimed is:

1. A method of replacing a fuel gas of a fuel cell apparatus, the fuel cell apparatus having an electric power generation unit comprising a plurality of stacked membrane electrode assemblies and fuel feed paths and oxidizer feed paths between the membrane electrode assemblies, each membrane electrode assembly having an oxidizer electrode, to which an oxidizer is fed via one of the oxidizer feed paths, a fuel electrode, to which a fuel is fed via one of the fuel feed paths, and an electrolyte membrane interposed between the oxidizer electrode and the fuel electrode, a fuel storage unit for holding the fuel to be fed to the fuel electrode of the electric power generation unit, a fuel flow path for connecting the fuel storage unit and the electric power generation unit, and a purge valve, the method comprising the steps of:

decreasing a volume of the one of the fuel feed paths by applying an outside force to the stacked membrane electrode assemblies in a stack direction of the membrane electrode assemblies to discharge a fuel gas in the one of the fuel feed paths through the purge valve; and supplying a fuel gas from the fuel storage unit to the one of the fuel feed paths by removing the force in a stack direction of the membrane electrode assemblies, and wherein the fuel feed paths and the oxidizer feed paths are formed from an elastic material.

\* \* \* \* \*

UNITED STATES PATENT AND TRADEMARK OFFICE
CERTIFICATE OF CORRECTION

| | |
|---|---|
| PATENT NO. | : 7,374,836 B2 |
| APPLICATION NO. | : 11/181767 |
| DATED | : May 20, 2008 |
| INVENTOR(S) | : Satoshi Mogi et al. |

It is certified that error appears in the above-identified patent and that said Letters Patent is hereby corrected as shown below:

<u>COLUMN 3</u>:

Line 28, "storing-a" should read --storing a--.

<u>COLUMN 6</u>:

Line 47, "and" should be deleted.

Signed and Sealed this

Fourteenth Day of October, 2008

JON W. DUDAS
*Director of the United States Patent and Trademark Office*